Sept. 27, 1949. H. HEIMANN ET AL 2,483,383
TOOL FOR HANDLING OPEN-ENDED SPRING RETAINING RINGS
Filed Jan. 29, 1946 3 Sheets-Sheet 1
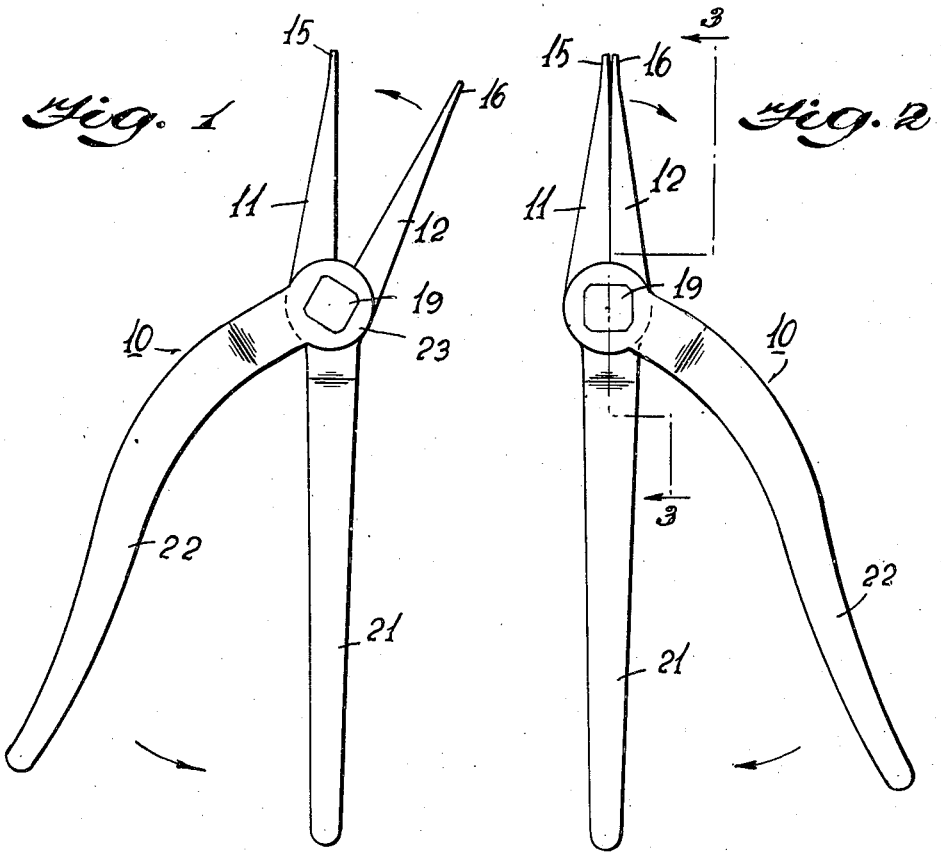
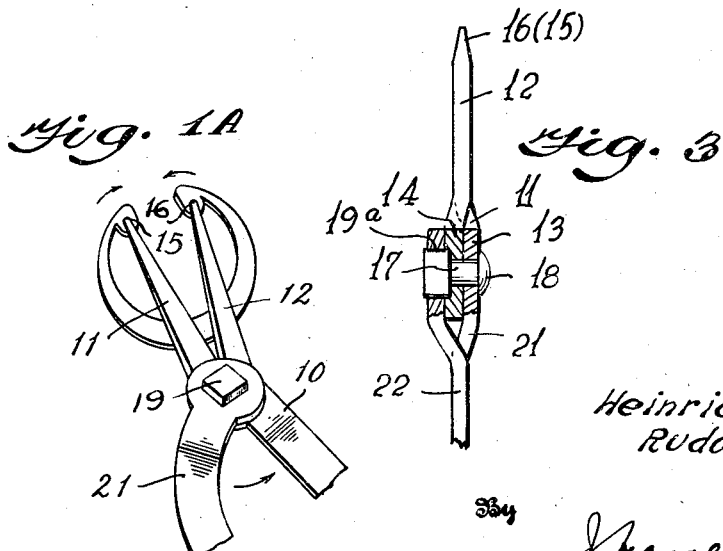
Inventors
Heinrich Heimann,
Rudolf Feitl,

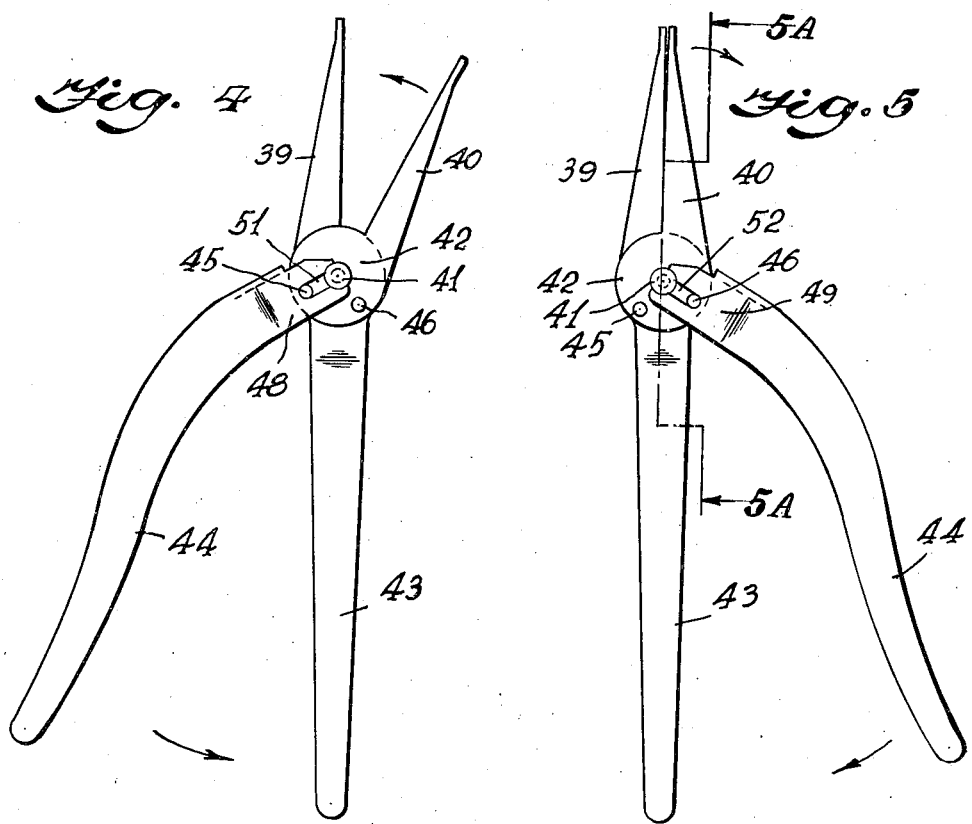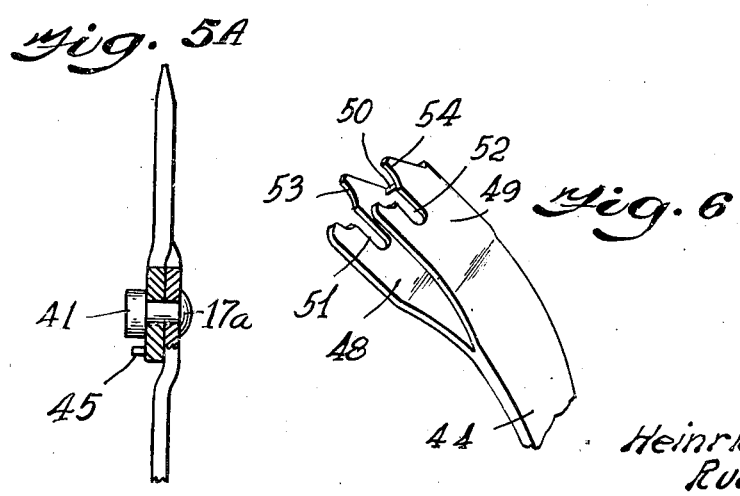

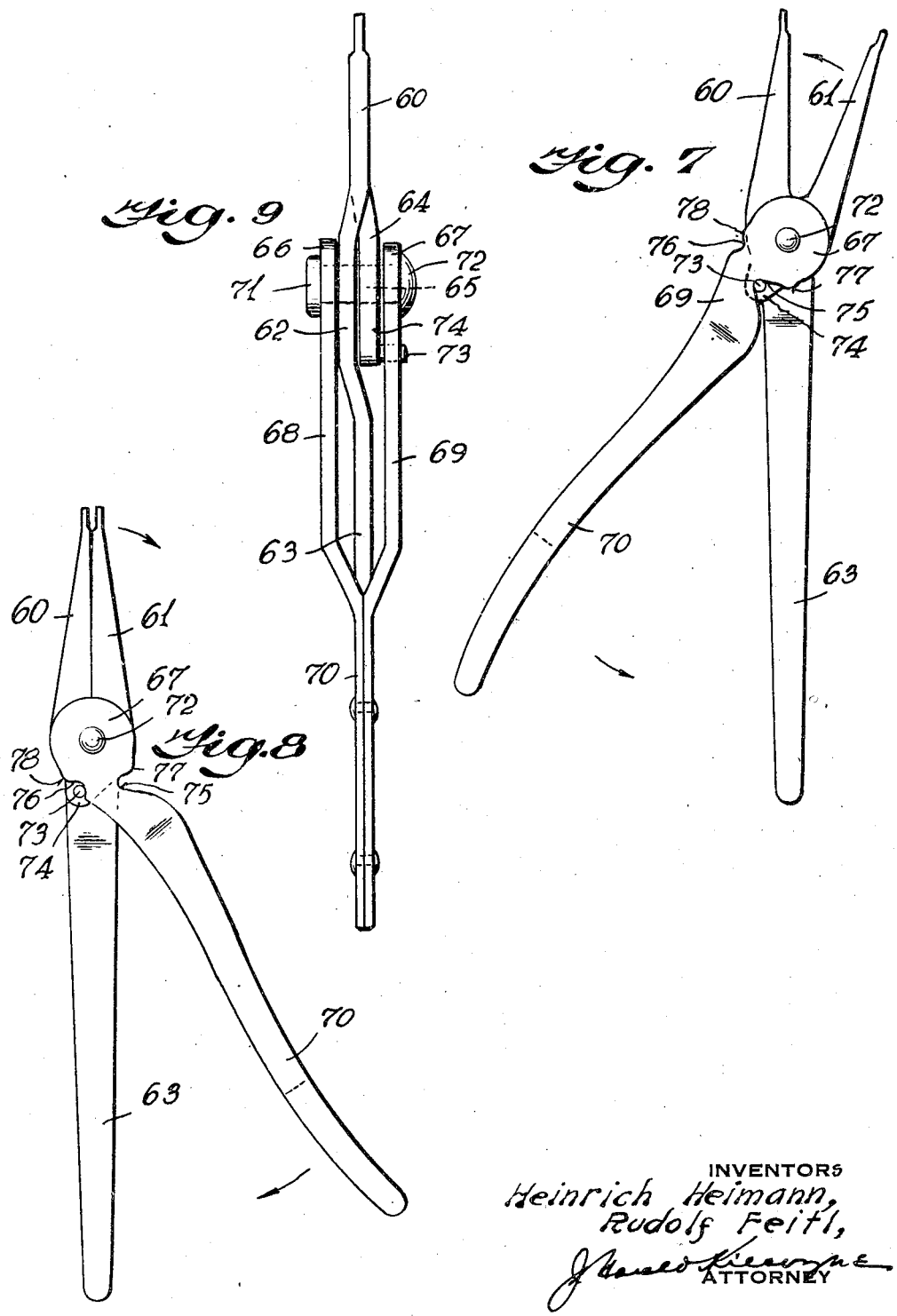

Patented Sept. 27, 1949

2,483,383

UNITED STATES PATENT OFFICE 2,483,383

TOOL FOR HANDLING OPEN-ENDED SPRING RETAINING RINGS

Heinrich Heimann, New York, and Rudolf Feitl, Brooklyn, N. Y., assignors to Waldes Koh-I-Noor, Inc., Long Island City, N. Y., a corporation of New York Application January 29, 1946, Serial No. 644,068

10 Claims. (Cl. 81—5.1)

1

This invention relates to improvements in tools for handling open-ended spring retaining rings, and more particularly to a plier-type tool which is convertible so as to handle both the external and the internal retaining rings.

As is well known, open-ended spring retaining rings are adapted to be sprung into a shaft or housing bore groove and thereupon to form an artificial shoulder thereon or therein for securing a machine part against axial displacement. The assembly of such rings usually requires, in the case of the external ring, that they be spread over the shaft end and shifted along the shaft to the plane of the seating groove, and, in the case of the internal ring, that they be contracted to an outer diameter smaller than that of the housing bore and thereupon moved into the bore. The reverse operations are of course required to disassemble such rings. To assist in handling rings as aforesaid, it has been proposed, for example, in Heiermann Reissue Patent No. 18,144, to form the open ends of the rings as ears or lugs provided with apertures into which the working points provided on plier-like handling tools are inserted for the purpose of spreading or contracting the ring, depending upon whether it is of the external or internal type.

Hitherto, separate and in general two different types of pliers were required, one type for the internal and the other for the external rings. This requirement has proved to be a disadvantage to the use of such rings, because a mechanic who is called on to replace retaining rings in the field must not only carry several sizes of pliers for the handling of the different sizes of rings, but must also carry two complete sets of tools by virtue of the fact that replacement of external as well as internal rings may be called for.

The invention aims to overcome the above-noted disadvantages of the presently used tools by providing a tool which is capable of handling both types of retaining rings, and more particularly a tool which, by a simple operation, is convertible to use with either external or internal rings, whereby for the same ring sizes one tool may be employed in the installation and/or replacement of both external and internal rings.

It is a further object of the invention to provide a convertible tool as aforesaid, which is of simple, rugged and inexpensive construction yet is characterized by thoroughly dependable operation.

2

Other objects will be in part obvious and in part hereinafter pointed out in connection with the following analysis of the invention wherein are illustrated in detail several physical embodiments of the convertible tool forming the subject matter thereof.

In the drawings—

Fig. 1 is an elevation of a plier-type tool organized for the handling of internal rings;

Fig. 1A is a perspective view illustrating more or less diagrammatically the use of the tool illustrated in Fig. 1;

Fig. 2 is a similar view of the same tool when converted to the handling of external rings;

Fig. 3 is a section taken along line 3—3 of Fig. 2;

Figs. 4 and 5 are views similar to Figs. 1 and 2 which illustrate a modified form of convertible tool according to the invention;

Fig. 5A is a section taken along line 5A—5A of Fig. 5, with detachable handle removed for clarity;

Fig. 6 is a detail in perspective illustrating the coupling end of the detachable handle incorporated in the Figs. 4-5 form of the invention.

Fig. 7 is an elevation of a further embodiment of a tool according to the invention, set up to handle internal rings;

Fig. 8 is a similar view of the Fig. 1 form of tool when converted to the handling of external rings; and Fig. 9 is a partial side view, taken from the left of Fig. 7.

Referring to the drawings, and more particularly to the form of tool illustrated in Figs. 1-3, reference character 10 indicates generally a plier-type tool according to the invention which in Fig. 1 is set up or organized to handle internal rings and in Fig. 2 converted to handle external rings. Such a tool comprises tips 11, 12 pivotally connected at their hub ends 13, 14, which are laterally offset as seen in Fig. 3, and which terminate at their free ends in working points 15, 16. The pivotal connection of the tips is effected by a pin 17 having bearing in hub 13 of tip 11, being provided at its one end with a securing head 18 and at its other end with a driving and coupling head 19. As illustrated, the driving head has non-circular (square) section and seats in a correspondingly shaped recess formed in and opening through the outer face of the hub 14. By forming the square recess so that it extends only partly through the hub 14, it will be seen that the pin 17 and its headed ends secures the hubs in face engagement, while permitting relative rotation of the hubs and tool tips 11, 12 on the axis of pin 17.

The working tip 11 is connected through its hub 13 with an integral handle 21, the longitudinal axis of which is taken as the tool center line. To the other working tip 12 is coupled a detachable handle 22 having an end hub 23 formed with a square sectioned opening which is dimensioned so that the handle hub can be snugly fitted over the driving head 19 of pin 17. By this arrangement, the handle 22 may be coupled to the tip 12, with the driving head 19 and the square recess providing a driving connection therebetween. Preferably, the detachable handle 22 is offset along its length as shown, so that both handles may be readily grasped and operated by one hand.

With the detachable handle coupled as shown in Fig. 1, a characteristic crossed-handle plier arrangement results. Hence, upon the working points 15, 16 being inserted in the apertures at the free ends of an internal retaining ring, as diagrammatically illustrated in Fig. 1A, movement of handles 21, 22 towards one another will result in corresponding movement of the tool points and hence in contraction of the ring and a decrease in its effective diameter so that it can be slipped into the housing bore.

To convert the tool shown in Fig. 1 to the handling of external rings, handle 22 is simply uncoupled from the driving head 19 and recoupled thereto in the symmetrically opposite position (to the other side of the handle 21 and hence of tool centerline), as illustrated in Fig. 2. In this handle position, the tool corresponds to a simple pivoted-handle type of pliers. Hence, upon the working points 15, 16 being inserted in the ring ear apertures, and the handles moved towards one another, the tool points 15 and 16 will move away from one another, thereby to spread the external ring so that it can be slipped over the free end of a shaft and shifted therealong to the plane of the groove in which it is to seat.

Referring to the modified form of convertible tool illustrated in Figs. 4–6, inclusive, such differs from the previously described tool in the coupling between tool tip and its detachable handle. As shown, the working tips 39, 40 are pivoted together at their inner or hub ends by means of a pivot and connecting pin 17a having an enlarged cylindrical head 41 extending beyond the outer face of hub 42 of the tip 40. The tip 39 is connected through its hub with an integral handle 43, whereas the handle 44 for tip 40 is detachable so that it can be coupled thereto in positions to either side of the axis of handle 43 constituting the tool center line.

According to the present modification, the hub 42 is provided with the two coupling pins 45, 46 which project from the outer face of hub 42 and which are disposed symmetrically to the sides of the center line of the hub corresponding to the inner edge of the tool point 40. The handle 44 has its coupling end forked to provide duplex prongs 48, 49 which are spaced to fit snugly over and straddle the tip hubs, being bridged by a stiffening and reinforcing yoke 50. The prongs 48, 49 are provided with aligned, longitudinally extending slots 51, 52 which open into semi-circular bearing seats 53, 54 formed in the end edges of the handle as seen in Fig. 6. The seats 53, 54 preferably have somewhat smaller diameter than of the head 41 of the pivot pin, so that when cooperated with the head they exert spring pressure thereon, contributing to a firm connection of handle 44 with hub 42 and its working tip 40.

As seen in Fig. 4, wherein the handle 44 is coupled to tip 40 to provide the cross-handle type of pliers, coupling was effected by moving the coupling end of the handle into engagement with the head 41, the hub pin 45 meantime entering slot 51. The handle 44 is firmly coupled to hub 42 by reason both of the snug fit of head 41 in seat 53 and by engagement of pin 45 against the bottom of slot 51. Accordingly, the working points of the tool may be inserted into the apertures of the ears of an internal ring and, by moving the handles towards each other, the ring can be contracted for insertion into a housing bore.

To convert the aforesaid tool for use with external rings, the handle 44 is detached and recoupled to the hub 42 and its tip 40 in its position to the other side of the handle 43 as seen in Fig. 5. When so converted, the working points of the tool can be inserted into the ring ear apertures and the rings spread by movement of the tool handles towards one another, as results in movement of the working points away from one another. With the detachable handle coupled as shown in Fig. 5, pin 46 extends through slot 52 of the coupling end of the handle, and head 41 of the pivot pin firmly seats in semi-circular seating recess 54.

According to the further form of convertible tool illustrated in Figs. 7, 8 and 9, reference characters 60, 61 indicate a pair of tool tips of which tool tip 60 is integrally connected through hub 62 with a handle 63, and tip 61 is provided with a hub 64, generally as described in the prior embodiments. The aforesaid hubs are secured by and rotate on the axis of a connecting pin 65, which also extends through the hubs 66, 67 formed at the forked ends 68, 69 of a handle 70 adapted to be operatively coupled to the tip 61 in the manner to be described. As seen in Fig. 9, the pin 65 is provided at its ends with the heads 71, 72 which serve to secure the parts against axial displacement. From the construction so far described, it will be appreciated that tip 61 and handle 70 may rotate relatively and independently of one another about pin 65.

As shown, connection between tip 61 and handle 70 is effected by means of a coupling pin or detent 73 which projects laterally from a depending arm 74 provided on hub 64 of tip 61, and which is adapted to seat one or the other opposite pin seats 75, 76 formed in the fork 69 adjacent the hub thereof.

As seen in Fig. 7, pin seat 75 is formed by the curved end edge of a transverse recess formed in the inside edge of handle fork 69, the adjacent hub edge being slightly eccentric or humped as at 77, so that a cam effect is obtained when pin 73 is forced past same to abut against the curved end of the recess. This results in the pin being maintained seated in the recess against a certain spring force which is sufficient to hold the parts against accidental displacement. The other pin seat 76 is in the form of a notch in the outside edge of the fork 69 and has a curved inner end providing an abutment, and adjacent the notch, the edge of the hub is formed somewhat eccentric and humped as at 78 whereby the pin is cammed into the seat and held against accidental displacement when seated.

Assuming the tool set up as in Fig. 7, with coupling pin 73 abutting against the curved end of the seating recess 75, tool tip 61 and handle 70 are locked against relative rotation in one direction, i. e. clockwise rotation of tip when the handle is held stationary. Accordingly, the tool points may be inserted into the apertures of an internal ring and the ring contracted as the handles are brought together. During such operation, the resistance of the ring to contraction assures proper tool functioning, in the manner of pliers of the crossed-handle type.

To convert the pliers into a tool for use with external rings, handle 70 with tip 61 is swung clockwise around pin 65 until the handle takes the approximate position shown in Fig. 8. Tip 61 is then swung counter-clockwise until the coupling pin seats in notch 76. If necessary the tips are then brought together, so as to spread the handles. Pin 73 now functions to prevent counter-clockwise rotation of the tip 61 with the handle 70 held stationary. Accordingly, the tool may now be employed to spread an external ring, the resistance of the ring to spreading insuring the rigidity of the joint between tip and handle.

Without further analysis, it will be seen that all of the illustrated forms of tool as described achieve the objects of the invention in providing a tool for handling open-ended retaining rings which is convertible to use with both internal and external types of rings. Moreover, all forms of tool are of exceedingly simple construction and design and are readily convertible by simple manipulation providing for coupling one of the tool handles relative to its working tip following its positioning to the one or other sides of the tool center line. Hence, a single tool according to any one form the invention may be employed to handle a range of ring sizes, regardless of whether the rings are of the internal or external type.

As many changes could be made in carrying out the above constructions without departing from the scope of the invention, it is intended that all matter contained in the foregoing description or shown in the accompanying drawings shall be interpreted as illustrative and not in a limiting sense.

We claim:

1. A plier-type tool for handling open-ended retaining rings of both the internal and external types requiring deformation in their assembly and disassembly, and which are provided at their open ends with apertured ears, comprising a pair of pivotally related tool tips terminating in working points for insertion into the ear apertures, a handle integral with one of said tips, a handle separate from the other tip, said separate handle being effective to operate the other tip when positioned in either one of two working positions to the opposite sides of the integral handle, and coacting coupling means operative between the other tip and the separate handle for selectively coupling said parts in either of the working positions of said separate handle.

2. A plier-type tool for handling open-ended retaining rings of both the internal and external types requiring deformation in their assembly and disassembly, and which are provided at their open ends with apertured ears, comprising a pair of pivotally related tool tips terminating in working points for insertion into the ear apertures, a handle integral with one of said tips, a handle separate from the other tip, said separate handle being effective to actuate said other tip towards said one tip when positioned to one side of the integral handle and to actuate said other tip away from said one tip when positioned to the other side of said integral handle, and coacting coupling means between the other tip and the separate handle for selectively coupling said parts in either one of said handle positions.

3. A convertible tool for handling open-ended retaining rings of both the internal and external types which are provided at their open ends with apertured ears, comprising a pair of tool tips terminating at their one ends in hubs and at their other ends in working points for insertion into the ear apertures, a pivot pin having bearing in one of said hubs and providing a pivotal connection for said tips, a handle integrally connected with one of said tips through said one hub, said pivot pin having a coupling and driving head affixed to and projecting from the other hub, and a handle for said other tip and being separate therefrom, said separate handle being effective to operate the other tip when positioned in either one of two working positions to the opposite sides of said integral handle and having provision whereby it may be coupled to said head when positioned to either side of the integral handle.

4. A convertible tool for handling open-ended retaining rings of both the internal and external types which are provided at their open ends with apertured ears, comprising a pair of tool tips terminating at their one ends in hubs and at their other ends in working points for insertion into the ear apertures, a pivot pin having bearing in one of said hubs and providing a pivotal connection for said tips, a handle integrally connected with one of said tips through said one hub, said pivot pin having a coupling and driving head of non-circular section affixed to and projecting from the other hub, and a handle for said other tip and being separate therefrom, said separate handle being effective to operate said other tip when positioned in either one of two working positions to the opposite sides of said integral handle and having a coupling end provided with a head seating hole of non-circular section corresponding to that of the head, said head and hole coacting in either one of said working positions of the separate handle to couple the latter to said other tip.

5. A convertible tool for handling open-ended retaining rings of both the internal and external types which are provided at their open ends with apertured ears, comprising a pair of tool tips terminating at their one ends in hubs and at their other ends in working points for insertion into the ear apertures, a pivot pin having bearing in one of said hubs and providing a pivotal connection for said tips, a handle integrally connected with one of said tips through said one hub, said pivot pin having a head projecting beyond the outer face of the other hub, a pair of spaced coupling pins also projecting from said face, and a detachable handle for said other tip formed at one end with duplex prongs straddling said hubs, each said prong having a semi-circular head recess and a coupling-pin receiving slot opening into the recess, said detachable handle being effective to operate said other tip when positioned in either one or two working positions to the opposite sides of the integral handle and when coupled to said other tip through seating of the pivot pin head and one of the other of said coupling pins in the head recess and slot respectively of one or the other of said prongs.

6. A convertible tool as set forth in claim 5, wherein the prongs are effective to impart spring gripping pressure on the pivot pin head when the latter is seated in the head receiving recess thereof.

7. A convertible tool for handling open-ended retaining rings of both the internal and external types, comprising a pair of tool tips each having hub portions, a handle for one of said tips and being integral with the hub portion of said one tip, a handle for the other tip and being separate from the hub portion thereof, a pivot pin common to said hub portions and said separate handle and mounting said handle for swinging movement in both directions past said tips to working positions to the opposite sides of the integral handle, and coacting coupling means on the hub portion of said other tip and the opposite edges of its separate handle and being effective to couple said parts in either of the working positions of said separate handle.

8. A convertible tool as set forth in claim 7, wherein said coupling means comprises a coupling pin projecting outwardly from the hub portion of said other tip into the path of movement of said swinging handle, and two abutment surfaces on the opposite edges of the separate handle against one or the other of which the coupling pin is adapted to engage and thereby couple said parts.

9. A convertible tool as set forth in claim 7, wherein said coupling means comprises a coupling pin projecting outwardly from the hub portion of said other tip into the path of movement of said swinging handle, and two abutment surfaces on the separate handle against one or the other of which the coupling pin is adapted to engage and thereby couple said parts, and wherein a projection is provided on each said opposite edges and adjacent each abutment surface to cam the coupling pin to coupled position.

10. A convertible tool for handling open-ended retaining rings of both the internal and external type, comprising a pair of tool tips having hubs formed at one end thereof, a pivot pin extending through said hubs, a handle integrally connected with one of said tips through the hub thereof, a handle for the other tip having forked ends terminating in hubs through which the pivot pin extends, the length of the forked ends being greater than the length of said other tip whereby the said last named handle can swing relatively to and independently of said other tip to working positions to either side of the integral handle, and means for operatively connecting the swinging handle and other tip in either working position comprising an arm extending from the hub of said other tip toward the forked end of the swinging handle, a pin projecting laterally from the face of said hub into the path of movement of the swinging handle, one prong of the latter handle being provided adjacent its hub with oppositely disposed pin-seating recesses whose edges form pin abutment surfaces, the arrangement and disposition of said parts being such that with the coupling pin seating in one recess the tool is capable of functioning as a cross-handle pliers and upon swinging movement of the handle to a position in which the coupling pin seats in the other recess the tool can function in the manner of a simple pivoted-handle type of pliers.

HEINRICH HEIMANN.
RUDOLF FEITL.

REFERENCES CITED

The following references are of record in the file of this patent:

UNITED STATES PATENTS

| Number | Name | Date |
| --- | --- | --- |
| 816,674 | Medhus | Apr. 3, 1906 |
| 1,122,165 | Schoening | Dec. 22, 1914 |
| 1,262,621 | Beacham | Apr. 16, 1918 |
| 2,058,072 | Fiddyment | Oct. 20, 1936 |
| 2,166,089 | Brenner | July 11, 1939 |
| 2,168,812 | Van Keuren | Aug. 8, 1939 |

FOREIGN PATENTS

| Number | Country | Date |
| --- | --- | --- |
| 197,047 | Switzerland | July 16, 1938 |